United States Patent [19]
Moore

[11] 3,891,249
[45] June 24, 1975

[54] DOUBLE PLATE WELDED OUTLET FITTING AND METHOD OF OBTAINING THE SAME

[76] Inventor: Charles H. Moore, 645 Matanzas Ct., Fort Myers Beach, Fla. 33931

[22] Filed: Feb. 16, 1973

[21] Appl. No.: 333,011

[52] U.S. Cl. .................................. 285/189; 285/286
[51] Int. Cl. .............................................. F16l 13/02
[58] Field of Search .................... 285/189, 286, 156

[56] References Cited
UNITED STATES PATENTS

| | | | |
|---|---|---|---|
| 1,556,451 | 10/1925 | Mauck | 285/189 X |
| 1,992,960 | 3/1935 | Miller et al. | 285/286 X |
| 2,421,596 | 6/1947 | Bruce et al. | 285/286 X |
| 2,981,556 | 4/1961 | Jackson | 285/156 X |

FOREIGN PATENTS OR APPLICATIONS

| | | | |
|---|---|---|---|
| 896,089 | 4/1944 | France | 285/286 |
| 311,343 | 3/1930 | United Kingdom | 285/189 |

Primary Examiner—Thomas F. Callaghan

[57] ABSTRACT

A composite metal outlet fitting for insert-welded attachment to metal conduits, pipes, cylindrical vessels, etc., which comprises, after forming, a pair of tightly adhered inner and outer bodies which are substantially stress-free and otherwise highly efficient in operation; together with a relatively simple and inexpensive method by which it may be obtained, the same including the use of a pair of circular plates which are metallurgically dissimilar and of different diameters, the periphery of the smaller of said plates being welded to the adjacent surface of the larger of said plates.

3 Claims, 5 Drawing Figures

DOUBLE PLATE WELDED OUTLET FITTING AND METHOD OF OBTAINING THE SAME

The invention relates to outlet fittings for relatively large size metal conduits, pipes, cylindrical vessels and the like which are to receive liquids and gases under substantial pressures as in the case of oil and gas transmission lines.

It has long been customary to form suitable peripheral outlets in such conduits, cylindrical vessels etc. (usually with a welding or cutting torch) and apply to the outlet a branch outlet fitting which extends at an angle thereto.

As an illustrative embodiment, a 24 inch Schedule 80 line pipe may be provided with a peripheral aperture of sufficient size to receive in welded engagement a flueing plate having a right-angularly extending flue which is adapted for welding engagement at its outer end with an 18 inch Schedule 80 branch pipe.

In the past such outlet fittings have been characterized by being costly to manufacture, difficult to install, inefficient in operation, or a combination of these undesireable factors.

One well-known and still popular prior art practice is to burn a piece of pipe of the proper scheduled thickness to conform to the sweep or curvature of the run pipe (if in a pipe line) or to the inside diameter of a pressure vessel (in the case of a pressure vessel outlet connection); burn a circular hole in the run pipe which conforms to the outside diameter of the branch pipe (or shell of the pressure vessel); place the branch pipe in the run pipe (or pressure vessel shell); and then weld the various parts together at their points of contact, which results in the formation of an objectionable sharp corner in the fluid passageway. Finally a metallic reinforcing pad which conforms to the outside diameter of the run pipe (or pressure vessel) and which has an aperture to go over the branch pipe is disposed between said pipes and welded in position.

Another prior art practice for forming flued plates for welding connections is to machine a single circular metal plate of substantial initial thickness in such manner as to provide one surface thereof with a low-angle frusto-conical cavity of relatively large diameter, provide a small elliptical lead-hole in the center of said plate, heat said plate to forging temperature, place the plate between a pair of male and female dies which are conformed to provide the contour of the pipe, conduit or vessel, such as a 24 inch line pipe, and then run a flueing plug, or succession of progressively larger flueing plugs, upwardly through the lead-hole to form the flue or collar. The immediately aforementioned prior art practice is objectionable because of the high cost of the very substantial machining step which is a necessary part thereof.

It is among the objects of the present invention to form flued connections of the type generally described but wherein the portion carrying the flue is laminated; for example, an inner layer or laminae of stainless steel or other metal of comparatively high quality which is to a very large extent backed-up by a layer or laminae of carbon steel or other metal which is of lesser quality and which, accordingly, is less expensive.

In this manner, the interiorly lined flued connecting or outlet plate may be effectively used on a conduit or vessel which has a lining of similar character. In addition, very substantial machining costs are eliminated by the use of the laminated work-piece, as will be explained more fully hereinafter.

Another object is the provision of a laminated flueing connection of the type described and possessing the foregoing advantages wherein the more costly metal of the interior lamination is very tightly adhered to the outer lamination of less expensive material.

Still another object is to provide a connection of the type described which is characterized by possessing sufficient reenforcement to compensate for the weakening of the wall of the structure which is caused by the formation of the opening therein.

A further object is the attainment of the foregoing objectives by the use of a method which is relatively inexpensive and quickly and easily performed, with apparatus of existing design which is readily available.

The foregoing and other objects will become more readily understood from the following description to be read in conjunction with the annexed drawings wherein like reference characters represent like parts and wherein:

FIG. 1 which is representative of the first prior art practice earlier discussed is a schematic elevational view of a conventional connection between a run pipe or a pressure vessel having a cylindrical curvature, and a branch pipe of smaller diameter, the left-hand portion of this view being taken at right-angles with respect to the axis of the run pipe or pressure vessel; and the right-hand portion of this view being taken on a plane which contains said axis;

Figure 1:
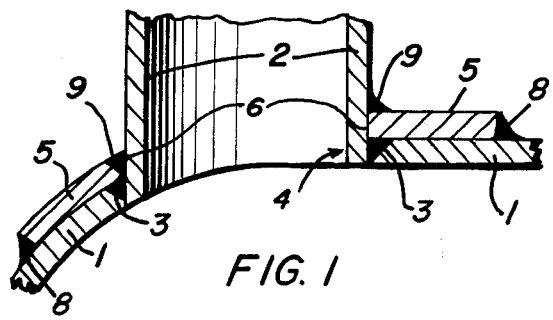

Referring more particularly to the drawings, in FIG. 1 there is illustrated a conventional welded connection between a run pipe or pressure vessel 1 and a branch pipe 2 which exends at substantial right-angles with respect thereto. According to this arrangement, and as briefly described hereinbefore, a piece of pipe of the proper scheduled thickness is burned to the sweep or curvature of the run pipe if in a pipe line, or to the inside diameter of a pressure vessel shell if for a pressure vessel connection. A circular hole of the outside diameter of the branch pipe is then burned into the run pipe, or in the shell of the pressure vessel. The branch pipe is placed in run pipe or pressure vessel shell and is welded to the same as shown at 3. This leaves a sharp corner at the point indicated at 4 which gathers all kinds of objectionable stresses and is the location of many failures.

Continuing with the conventional connection described immediately hereinbefore, a metal reinforcing pad 5 is formed to fit the outside diameter of the run pipe, or pressure vessel. This reinforcing pad 5 is provided with an aperture 6 to permit its insertion over the branch pipe; and is welded at the points indicated at 8 and 9. As will be noted, these continuous welds 8 and 9 are necessarily uphill and downhill due to the curve or sweep of the run pipe (or pressure vessel) and are therefore not easily made; and this is also true with respect to both the shaping of the pad 5 and in the welding of its edges to the edges of the metal conduit, pipe or cylindrical vessel with which it is to be connected.

Figure 2:
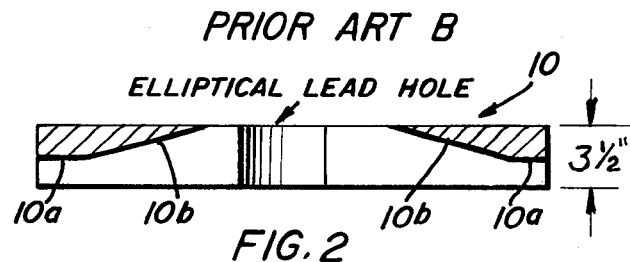
FIG. 2 is an elevational view of a conventional work-piece which is utilized in the secondly discussed prior art method of producing another and different prior art connection between a run pipe or a pressure vessel; and a branch pipe of smaller diameter.

Referring now to FIG. 2, the work-piece shown therein, and adapted for use in the second prior art method described herein, is generally indicated at 10 and comprises a circular metallic plate which, in the case of a connection or outlet fitting for a 24-inch branch pipe (or cylindrical pressure vessel) having an 18-inch branch pipe, might have a diameter of 32¼ inches, and an initial thickness of 3½ inches, and weighing approximately 810 lbs. In conformity with the second prior art practice discussed hereinbefore, one side of the circular metallic plate or disc 10 is, except for a relatively narrow band 10a adjacent the periphery, machined to provide a large low angle coniform recess 10b. Typically the weight-loss due to machining a work-piece 10 of the size described would be approximately 248 lbs., and result in the reduction of the work-piece from an initial weight of 800 lbs. to 562 lbs., not to mention the man-hours devoted to the machining operation itself. All of this results in a finished work-piece of the desired conformation which is very costly to obtain.

The desired contours for providing connection between the 24-inch run pipe and the 18-inch branch pipe are imparted to the prior art work-piece 10 by a pair of cooperating male and female die members and a plurality of progressively larger cooperating flueing plugs; all of which may be of entirely conventional design.

As will be observed hereinafter, and in FIGS. 3 and 4 of the annexed drawings, the connector or outlet fitting of the present invention is characterized by, among other things, 1. possessing no inside weld as at 9 in FIG. 1
2. the only weld is on the outside diameter of a small plate to a larger plate of the laminated work-piece when both are flat and are easily welded by an automatic welder as distinguished from uphill and downhill welding as illustrated at 13 in FIG. 3
3. there is liberal radius at the point of connection instead of the sharp corner 4 as in the prior art connector of FIG. 1
4. and no machining of the work-piece is necessary.

Figure 3:
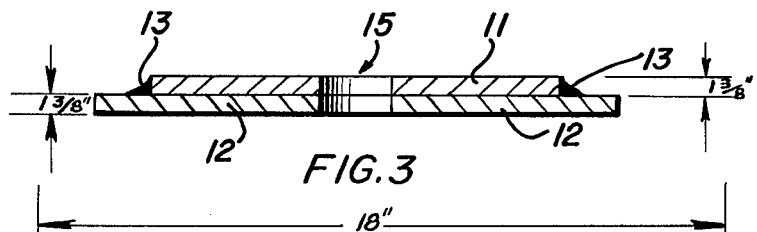
FIG. 3 is an elevational view of a work-piece which is used in the method of producing the flued connection or outlet fitting of the present invention prior to flueing.

Referring to FIG. 3, in the case of a 24-inch run pipe, or arcuate pressure vessel of the same size, and an 18-inch branch pipe, the method of the invention is commenced with two circular plates, one of 28¼-inch diameter and 1⅜-inch thickness; and the other being of 32¼-inch diameter and 1⅜-inch thickness. These dimensions are merely illustrative and would vary depending upon the shell or pipe thickness and the amount of reinforcement required.

The smaller circular plate 11 is concentrically disposed on the larger circular plate 12; and the periphery of the smaller plate is welded to the upper face of the larger circular plate, as indicated at 13.

A small elliptical lead hole 15 is placed in the center of both of the circular plates 11 and 12.

The composite or laminated work-piece comprising the small circular plate 11 (of 28¼-inch diameter and 1⅜-inch thickness) and the larger concentric circular plate 12 (of 32¼-inch diameter and 1⅜-inch thickness) to which it is welded, is now heated to forging temperature of both metals preparatory to the forging operation.

The forging apparatus used in the present invention may be of entirely conventional design; and it comprises a lower and upwardly extending die member 17 which is suitably supported on the bed of a forging press (not shown). The upper end of the upwardly extending lower die member 17 is rounded, as indicated at 17a and otherwise shaped, as indicated at 17b, to conform to the interior of the lower portion of the outlet fitting and to the curvature of the cut-out area of the run pipe which it is to replace.

Disposed above the upwardly extending lower die member 17 and fastened to the platen or movable element of the forging press (not shown) is the upper die member 19.

The lower portion of the upper die member 19 is concaved, as indicated at 19a, and otherwise shaped, as indicated at 19b, to conform to the sweep or curved exterior of the lower portion of the outlet fitting; and it includes a bore or upper cylindrical portion 19c which generally conforms to the exterior of the branch pipe portion of the outlet fitting.

The complete or laminated work-piece comprising the small and large circular plates 11 and 12 which are welded together along the periphery of the small circular plate, and which is now heated to forging temperature as before mentioned, is disposed with the elliptical center lead hole therein in alignment with respect to the upwardly extending lower die member 17.

The upper die member 19 is now lowered into appropriate relationship with the upwardly extending lower die element 17 until the composite or laminated work-piece composed of the small and large circular plates or discs 11 and 12 conform to the contour or sweep of the 24-inch line pipe with which it is intended to cooperate.

The next step is to successively run conventional flueing plugs of progressively larger diameter upwardly through the elliptical lead hole in the composite or laminated work-piece 11-12 until there is formed a suitable collar or flue for ultimate attachment to the aforementioned 18-inch branch pipe.

Figure 4:
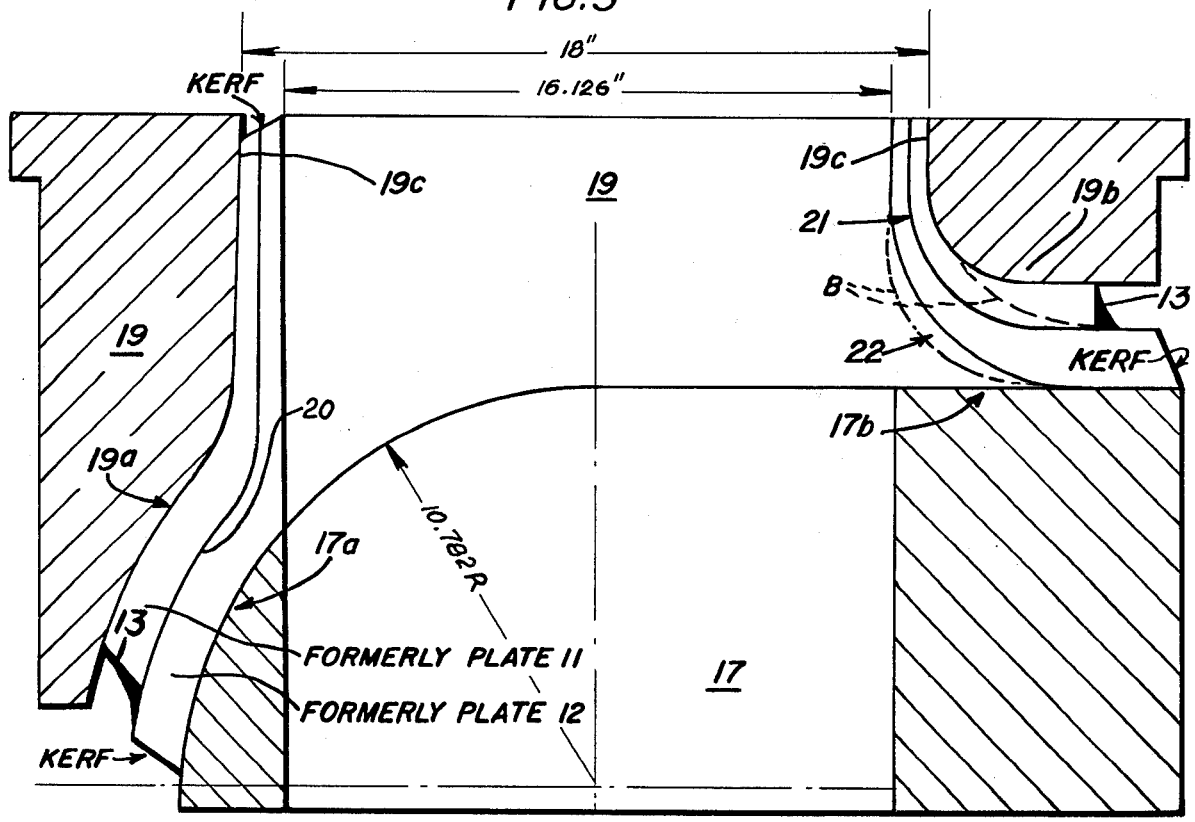
FIG. 4 is a view which is similar in nature to the view of FIG. 1 (prior art), but illustrating the connection or outlet of the invention and the cooperating die members wherein it is formed after having been flued.
Figure 5:
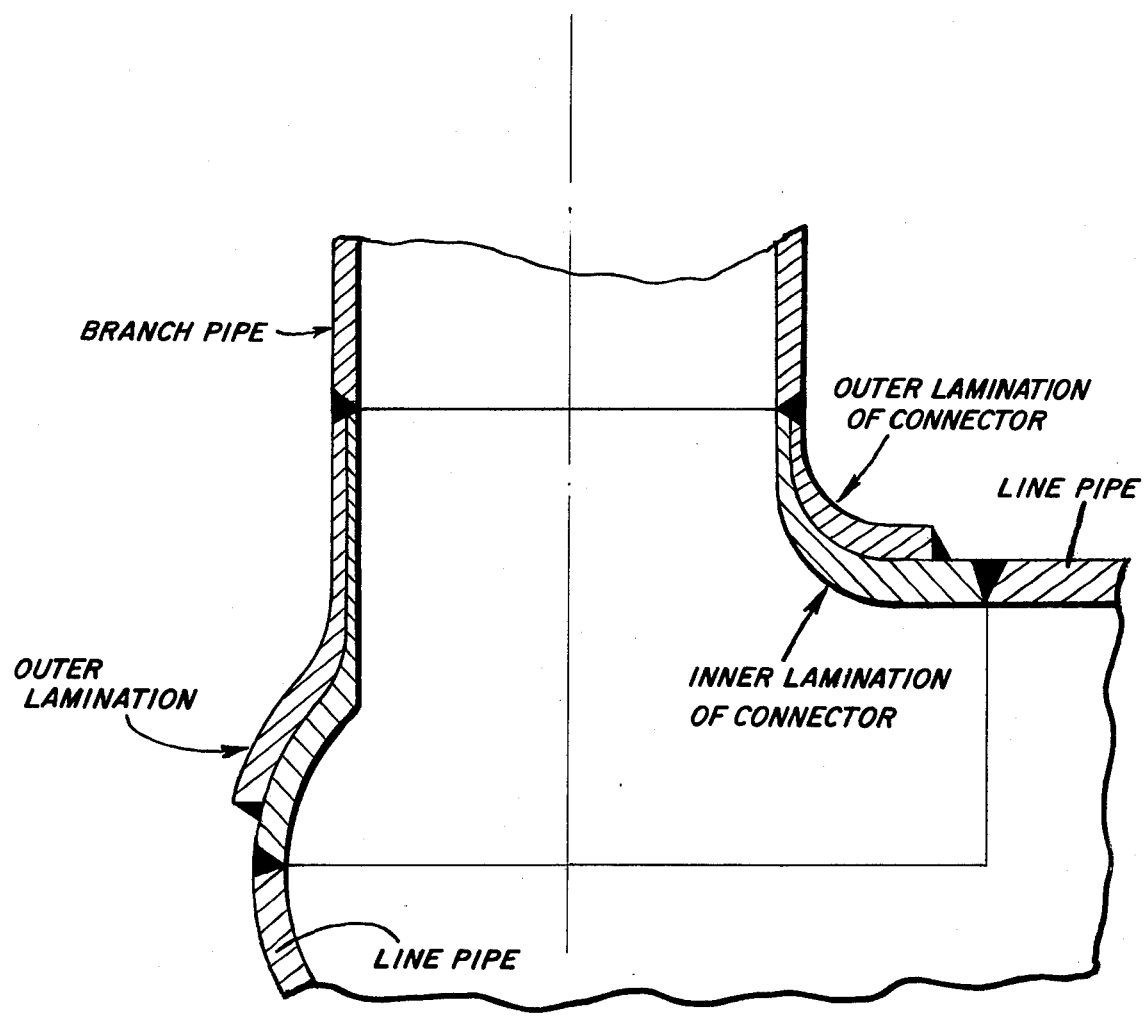
FIG. 5 is a fragmentary, sectional elevation illustrating the relationship between the assembled connector member and the line or main pipe and the branch pipe.

From FIG. 4 it will be noted that the deformation of the composite or laminated work-piece 11-12 between the lower die member 17 and the upper die member 19 provides a very tight fit over the curvature between the large circle and small circle of the contact areas 20 between the welded-together circular plates 11 and 12; also adjacent the base of the collar or flue for the 18-inch branch pipe, as indicated at 21. This liberal radius at 22, in lieu of a sharp corner, which would impede fluid flow is a very important feature of the present invention.

The close fit and tightness between those portions of the welded-together circular plates 11 and 12 adjacent the base of the collar or flue for the 18-inch branch pipe, which is also a very important feature, is produced by the final flueing plug which forces the two metal surfaces closely together against the bore or upper cylindrical portion 19c of the upper die member 19. The dotted lines indicated at B adjacent the upper right-hand corner of FIG. 4 illustrate the curvature which would have occurred if following the practice of the second prior art method referred to which utilizes the single-thickness circular metal plate or disc 10.

In use as a Tee, the top of the flue is kerfed and welded to a branch pipe and the weld to the branch pipe fastens the adjoining and contacting metal surfaces of the two work-piece sections or laminations 11 and 12. These two sections 11 and 12 may, if desired, be formed of identical material, or may, for example, be of simple steel on the one hand, and stainless steel on the other.

In any event, the larger circular plate 12 becomes the interior of the finished product, and the smaller circular plate 11 becomes exteriorly disposed reenforcement therefor.

The large edge of the connection or outlet fitting of the invention which is shaped from the large circular plate 12, and which is to be inserted in the outlet opening in the 24-inch run pipe and insert-welded to the periphery thereof is, of course, appropriately kerfed.

In use as a connector or fitting for a pressure vessel, a conventional welding neck flange (not shown) would be welded to the kerfed flue of the connection similar to a branch pipe connection as described hereinabove.

The A.S.M.E. Boiler Code provides that the area surrounding an opening must be adequately reinforced; and defines the area of reinforcement or strengthening of an opening as confined to a rectangle which is limited in its outside diameter by two times the diameter of the opening.

The other limitation as to the confinement of the area of reinforcement under the A.S.M.E. Boiler Code is two and one-half times the thickness of the shell either above or below the opening.

The process of the present invention is ideally adapted to produce a forging which readily conforms to these Code requirements.

The dimensions, radii, etc. in FIG. 4 are included to indicate the proportions they would assume in practicing the illustrative embodiment of the present invention with the composite or laminated work-piece comprising the small circular plate 11 (of 28¼-inch diameter and 1⅜-inch thickness) and the larger concentric circular plate 12 (of 32¼-inch diameter and 1⅜-inch thickness) to which it is welded in the production of a Tee connector for a 24-inch scheduled 80 line or run pipe and a 16-inch schedule 80 branch pipe.

Having thus described the invention what I claim as new and desire to secure by Letters Patent is:

1. A dual thickness metallic outlet fitting adapted to be welded to an opening in a main tubular member at one end and welded to a branch pipe at the other end, comprising a passageway through the fitting for providing communication between the main tubular member and the branch pipe
   a. said fitting being composed of two centrally apertured initially circular metallic plates of different outside diameters which are welded together to form a composite work-piece that is thereafter forged into a generally dome-shaped base member
   b. the periphery of the smaller metallic plate being inwardly spaced at all points from the periphery of the larger metallic plate
   c. an annular portion extending outwardly from the generally dome-shaped base member and adapted to be welded at its outer end to a branch pipe
   d. said annular outwardly-extending portion, including the terminus thereof being formed from the metal of both of the aforementioned circular metallic plates
   e. that portion of the fitting which is adapted to be welded to the main tubular member being formed by the metal of the larger metallic plate only.

2. The outlet fitting of claim 1 wherein the area between the periphery of the generally dome-shaped member and the point of connection therewith of the integrally formed outwardly extending portion being provided with reenforcement which is sufficient to compensate for the weakening of those areas in the fitting which were caused by the formation of the passageway therein.

3. The outlet fitting of claim 1 wherein all of the edges of both of the layers thereof are kerfed for in performing its welding attachment to the members with which they are to cooperate.

* * * * *